May 31, 1927.

H. K. WHEELOCK

TIRE REPAIR VULCANIZER

Filed Aug. 27, 1925

INVENTOR.
HERBERT K. WHEELOCK
BY
ATTORNEY.

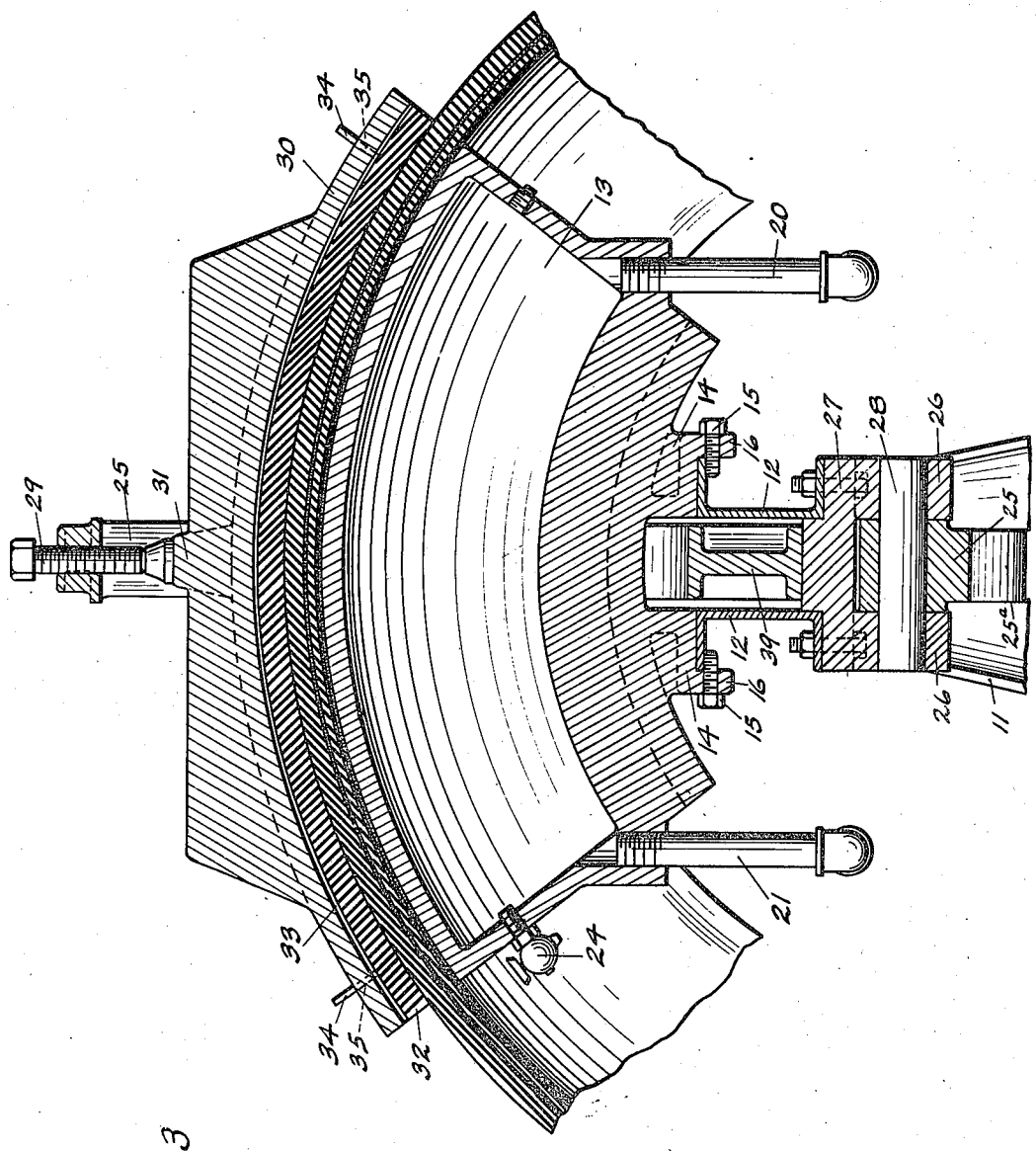

Patented May 31, 1927.

1,630,815

UNITED STATES PATENT OFFICE.

HERBERT K. WHEELOCK, OF AKRON, OHIO, ASSIGNOR TO THE AKRON TYRWELDER COMPANY, OF AKRON, OHIO, A CORPORATION OF OHIO.

TIRE-REPAIR VULCANIZER.

Application filed August 27, 1925. Serial No. 52,755.

This invention relates to tire repair vulcanizers, and especially to such vulcanizers of the steam core type.

In the repairing of cord tires, the majority of repairs are made on the inside of the tire carcass, and it is one of the objects of the invention to construct a device for efficiently vulcanizing repairs by heat applied directly to the inside of the casing. It is also an object of the present invention to provide apparatus which can be used with varying styles and makes of tires, and which will accommodate itself to the tire structure and, at the same time, secure a very high degree of pressure and superior results over former methods and apparatus in use. Repair vulcanizers formerly used required skillful operators, and even with the best operators and the most skillful use of the devices, the results were oftentimes unsatisfactory. The present invention enables the most difficult repairs to be accomplished easily and satisfactorily.

The present invention in particular is directed not only to the provision of means to exert pressure evenly over the entire surface, but to apply the heat where needed without overcuring the tread. It also dispenses with the use of soapstone and non-skid pads, and yet so thoroughly welding the repair to the carcass that the repair actually becomes a part of the tire.

An important object of the invention is to provide pressure plates having yielding surfaces in contact with the surfaces of the tire, which when once adjusted, exert pressure upon the work during the entire curing operation, thus obviating the necessity of adjusting the pressure plates from time to time while the cure is in process. As a means for accomplishing this result, there are shown resilient studded cushions attached to the faces of the plates for pressing the tire, regardless of its shape uniformly and evenly against the core. Other yielding means might be used for this purpose.

Another object is to provide improved means for connecting the cushions to the pressure plates.

Another object of the invention is to provide resilient studded cushions embedded in the seat of the steam core to give firm contact to any shape of bead.

Another object of the invention is to provide tread and side wall pressure plates adapted to be readily separated for removal of the tire from the core and having means adapted to urge the tread plates onto the tire and means for urging the side plates against the tire on the core.

The foregoing and other objects are obtained by the construction illustrated in the accompanying drawings and described in detail below. It is to be understood that the invention is not limited to the specific construction shown and described.

Of the accompanying drawings:

Figure 3 is a section on line 3—3 of Figure 2.

Figure 1:
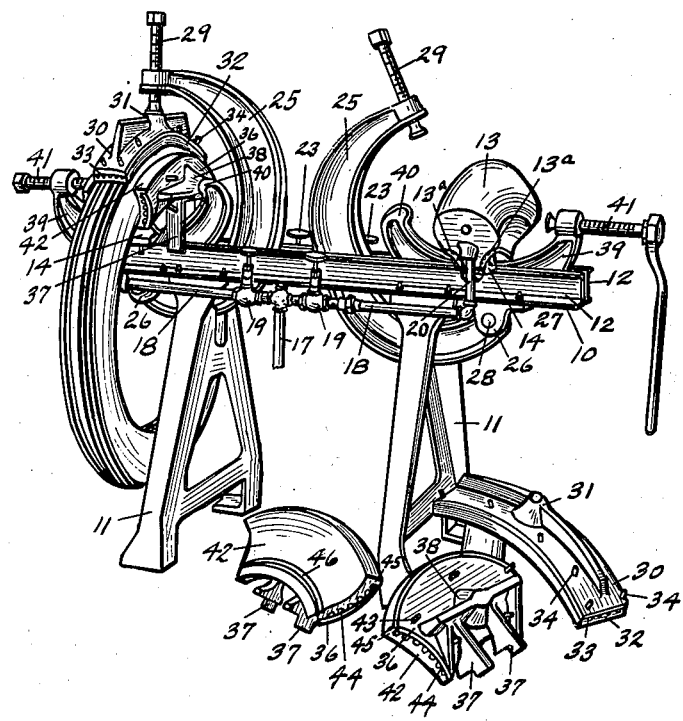
Figure 1 is a perspective view of a double frame vulcanizer unit embodying the invention, one of the repair devices being shown with a tire therein, and the other in readiness for receiving a tire, the repair of which is to be effected.
Figure 2:
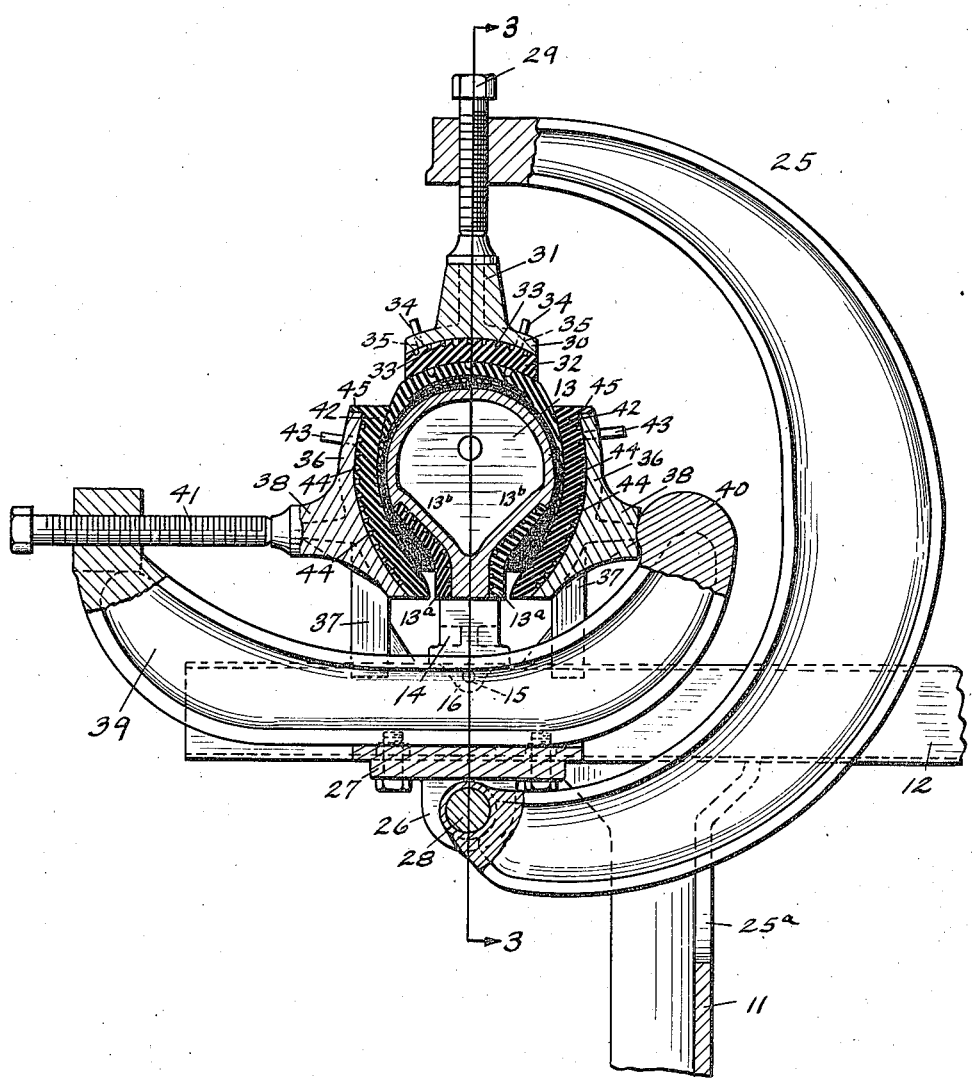
Figure 2 is a front elevation partly in section of a vulcanizer unit with a tire mounted therein.

Referring to the drawings, 10 represents a suitable supporting frame comprising legs 11, 11 on which are mounted parallel spaced channel beams or rails 12, 12 having supported thereon hollow, steam cores 13, 13 each formed with supporting feet 14, 14 resting on channels 12 and adapted to be secured thereon by set screws 15, 15 extending through lugs 16, 16 into engagement with channels 12. Steam or other heated fluid medium may be supplied into cores 13 by means of a supply pipe 17 and branch pipes 18, 18 by pipes 20, 20. For draining cores 13, pipes indicated at 21 are provided which are connected to branch drain pipes (not shown) leading to a common drain pipe (not shown) on the rear of the device and each controlled by a valve 23. To permit periodical blowing off of cores 13, cocks, indicated at 24, are provided thereon. At the seats of core 13 there are embedded therein resilient cushions $13^a$, $13^a$, preferably of rubber studded or ribbed, as at $13^b$, $13^b$, next to the core so as to provide for uniformly contacting with beads of different shapes.

For pressing the tread portion of a tire against each core 13, there is pivoted between beams 12 a heavy steel clamp 25 of crescent shape, lugs 26, 26 formed on members 27 bolted onto the under side of channels 12 supporting a pivot pin 28 on which the clamp 25 swings. Clamp 25 has a clamping screw 29 in its free end which is adapted to be swung over the top of core 13 whereby pressure may be applied to a tread pressure plate shown at 30. A vertical slot 25ᵃ is provided in each leg 11 in which clamp 25 is operable and the bottom of which affords a rest therefor when swung to an inoperative position. The plate 30 has formed thereon a stud 31 projecting a considerable height thereabove and arranged to be engaged by screw 29, whereby the plate under pressure will adapt itself to the general periphery of the tire and core 13. On the under side of plate 30 there is provided a resilient cushion 32 preferably of vulcanized rubber having a smooth under surface. In order to increase the yielding qualities of the cushion, it may be desirable to form the surface of the cushion next to the under surface of plate 30, with studs, ribs or other projections 33, 33 regularly or irregularly arranged and adapted to provide additional cushioning qualities in such a way as to cause said cushion to assume the general shape of the tire tread, and to thus evenly and uniformly press the tread portion of the tire against core 13. For attaching cushion 33 to plate 30, tits of rubber 34, 34 are formed thereon of such height as to be inserted and then drawn through apertures 35, 35 in the plate 30, said apertures being of less diameter than said tits, to draw the cushion 33 against the inner surface of plate 30, stretching of the tits by this action reducing the diameter thereof to facilitate drawing of the same through the apertures and expanding after tension thereon is released to fill the apertures so that they will have a gripping action in the apertures.

The side pressure plates 36, 36 are each similar in construction to plate 30, but are shaped generally to the contour of the sides of the tire and each is mounted on a slide 37 mounted on and embracing channels 12. Each side pressure plate 36 has a stud 38 thereon similar to stud 31 and the plates 36 are adapted to be urged against the core 13 by a yoke 39 resting on member 27 between channels 12 and having one fixed jaw 40 on one end, toward and from which is operable a clamping screw 41 threaded through the other end. Plates 36 each have resilient cushions 42, 42 thereon connected thereto in a similar manner to the connection of cushion 32 to plate 30 by tits of rubber 43, 43 and preferably being studded or ribbed similarly to cushion 32 as at 44, 44. Cushions 42, in addition, are supported on plates 36 by portions 45, 45 thereon extending over the upper edges of said plates.

In the use of the apparatus as descibed above and initially as shown at the right of Figure 1, the tire to be repaired is mounted over core 13 with the repaired portion to be vulcanized in contact with core 13. The side plates 36 are then mounted on channels 12, between jaw 40 and the core 13 and screw 41 and the core, and the screw 41 is actuated to urge plates 36 against the core, the cushions 42 shaping themselves to the sides of the tire, the inner surface of the beads engaging cushions 13ᵃ, which assume the shape thereof under the pressure of the beads. The tread plate 30 is mounted on the tread over the core and clamp 25 is swung to the right, carrying screw 29 over stud 31. The screw 29 is then actuated to press plate 30 against the tire which is evenly pressed by cushion 32 against the core, the rubber of the cushion shaping itself to the tread.

The vulcanization is now effected, steam being admitted to core 13 to bring it up to the desired temperature for the required length of time. The steam supply is cut off when vulcanization has been effected, the clamps 25 and 39 are loosened, and plates 30 and 36 are removed, clamp 25 being swung out of the way to permit removal of tire from core 13.

It will appear from the foregoing that a steam core vulcanizer unit has been provided in which the tire is uniformly and evenly pressed onto the core with sufficient pressure for the purpose, whereby the tire may be repaired from the inside in an effective manner and without over-vulcanization of those portions of the tire such as the tread and sidewalls, which subsequently would be subject to rapid deterioration.

Modifications of the invention may be resorted to without departing from the spirit thereof or the scope of the appended claims.

What is claimed is:

1. A tire repair vulcanizer comprising, a hollow core having deformable rubber cushions in the bead seating portions thereof, means for supplying a fluid heating medium to the core, a pivoted clamp operable over the core, a tread plate, means on said clamp to urge said plate against the tread of a tire on said core, said plate having a rubber cushion on its tire engaging surface conformable to the shape of the tread of said tire, side plates, and a clamp embracing the core and adapted to urge both of said side plates against said tire on said core, each of said side plates having rubber, tire engaging cushions thereon conformable to the shape of the sides of the tire.

2. A tire repair vulcanizer comprising, a hollow core, means for supplying a fluid heating medium to the core, a pivoted clamp operable over the core, a tread plate, means on said clamp to urge said plate against the tread of a tire on said core, said plate having a cushion on its tire engaging surface, conformable to the shape of the tread of said tire, side plates, and clamp embracing the core and adapted to urge both of said side plates against said tire on said core, each of said side plates having tire engaging cushions thereon conformable to the shape of the sides of the tire.

3. A tire repair vulcanizer comprising, a hollow core, means for supplying a fluid heating medium to the core, a pivoted clamp operable over the core, a tread plate, means on said clamp to urge said plate against the tread of a tire on said core, side plates, and a clamp embracing the core and adapted to urge both of said side plates against said core.

4. A tire repair vulcanizer, including a heated core, and means for urging a tire against said core, said means comprising a pressure plate, a cushion on said plate, said cushion having projections formed thereon on the surface against said plate.

5. Apparatus of the class described, comprising a pressure plate having a resilient cushion thereon, said cushion having projections thereon on the side against said plate.

6. Apparatus for repairing tires, comprising a core and a pressure plate for pressing a tire against said core, said plate having a resilient cushion on its inner surface, which cushion is free at its edges so that it will flow under pressure.

7. In combination, a resilient member and a rigid member and means for detachably securing the resilient member on the rigid member, comprising tits formed on the resilient member and apertures in the rigid member through which the tits are insertable, said tits being of such length as to permit drawing of the resilient member thereby against the rigid member, after the tits have been inserted through the latter.

8. A tire vulcanizing apparatus, comprising parallel supporting rails, a segmental core located transversely of and secured to the upper surface of the rails, a loose yoke lying between the rails, side plates adapted to be forced against the side of the tire by the yoke, a clamp pivoted beneath the core, and a tread plate adapted to be forced against the tread of the tire by the clamp.

9. A tire vulcanizing apparatus, comprising parallel supporting rails, a segmental core located transversely of and secured to the upper surface of the rails, a loose yoke lying between the rails, side plates adapted to be forced against the side of the tire by the yoke, a clamp pivoted beneath the core, a tread plate adapted to be forced against the tread of the tire by the clamp, and yielding tire contacting elements carried by the plates.

10. A tire repairing apparatus, comprising a core, a pressure plate for operations on a tire on said core, and a deformable cushion element on the face of said plate, the edges of said element being free so that the element is adapted by pressure of said plate against a tire on said core to conform to the outer surface of the tire being repaired.

11. A tire repair vulcanizer of the internal heated arm type comprising a longitudinally arcuate, sectional core adapted to support a section of a tire to be repaired thereover, separate longitudinally arcuate tread and side pressure plates having yielding pressure faces and adapted to be fitted about the section of the tire on said core, and means for pressing said plates against said tire.

12. A tire repair vulcanizer of the internal heated arm type comprising a longitudinally arcuate, sectional core adapted to support a section of a tire to be repaired thereover, separate longitudinally arcuate sectional tread and side pressure plates adapted to be fitted substantially about the entire section of the tire on said core, means for pressing said side plates against said tire, and independent means for pressing said tread plate against said tire.

HERBERT K. WHEELOCK.